United States Patent [19]

Zanin et al.

[11] Patent Number: 5,415,778
[45] Date of Patent: May 16, 1995

[54] METHOD AND RELATED PRODUCT FOR PURIFICATION OF WASTE WATER

[75] Inventors: Roberto Zanin, Montebelluna; Gaetano Boetti, Treviso, both of Italy

[73] Assignee: HydroGeo North America L.L.C., Bloomfield, Conn.

[21] Appl. No.: 203,282

[22] Filed: Feb. 28, 1994

[30] Foreign Application Priority Data

Mar. 3, 1993 [IT] Italy .................................. TV93A0019

[51] Int. Cl.$^6$ .............................. C02F 1/62; C02F 1/54
[52] U.S. Cl. ..................................... 210/631; 210/727; 210/730; 210/906; 210/908; 210/912; 252/180
[58] Field of Search ............... 210/727, 730, 912, 631, 210/906, 908; 252/180, 181

[56] References Cited

U.S. PATENT DOCUMENTS

| | | | |
|---|---|---|---|
| 3,872,002 | 3/1975 | Musgrove | 210/908 |
| 4,746,442 | 5/1988 | Calemma et al. | 210/725 |
| 4,861,481 | 8/1989 | Allen, III | 210/502.1 |
| 4,913,586 | 4/1990 | Gabbita | 210/751 |
| 5,213,692 | 5/1993 | Hjersted | 210/710 |
| 5,302,180 | 4/1994 | Hjersted | 210/917 |

FOREIGN PATENT DOCUMENTS

| | | | |
|---|---|---|---|
| 4856 | 1/1975 | Japan | 210/730 |
| 3983 | 1/1980 | Japan | 210/730 |
| 6286 | 1/1983 | Japan | 210/730 |
| 79509 | 5/1983 | Japan . | |

Primary Examiner—Neil McCarthy

[57] ABSTRACT

A method and related product for purification of waste water, especially of water polluted with phosphorus, nitrogen, heavy metals, and chlorinated solvents. The purification process consists of:

a) adding two liquid mixtures in sequence to the waste water;

b) letting the pollutants react with the two mixtures;

c) subsequently removing the sludge that forms.

One of the two liquid mixtures in question is a liquid mixture of two acids that may be extracted from lignite, leonardite and fossils of vegetal origin like peat.

7 Claims, 1 Drawing Sheet

METHOD AND RELATED PRODUCT FOR PURIFICATION OF WASTE WATER

CROSS-REFERENCE TO RELATED CASE

This same invention has been filed by the same inventors with the Italian Patent Office on Mar. 3, 1993, receiving filing no. TV93A000019. Its title literally translated is: Improvement on a method and relative product for purification of waste water, especially of water polluted with phosphorus, nitrogen, heavy metals, and chlorinated solvents.

A previous invention, relating to the same problem exposed in the title, and more closely related to the above referenced invention, has been filed with the Italian Patent Office in the name of the same inventors, on Nov. 12, 1990, receiving filing no. 82639 A/90.

BACKGROUND-FIELD OF INVENTION

This invention relates to environmental pollution control, and especially to the purification of industrial waste water. It specifically addresses the purification of water polluted with phosphorus, nitrogen, heavy metals, and chlorinated solvents.

BACKGROUND-DESCRIPTION OF PRIOR ART

It is renown how industrialization and society's carelessness contribute to heavy water pollution problems. In particular, industrial discharge, urban discharge, agricultural fertilizers, and other substances unnaturally enrich waters, causing high concentrations of phosphorus, nitrogen, heavy metals, and chlorinated solvents.

A first method of denitrification is available through naturally-present micro-organisms that in anaerobic conditions reduce nitrates into nitrogen and nitrogen oxide that are freed into the atmosphere. These microorganisms are heterotrophic bacteria, and can be induced, if present in sufficient quantity, to denitrify natural waters, on the condition that the water has an adequate source of carbon. Some problems intrinsic with biologic denitrification depend on the type of carbon source used, to guarantee the lowest possible residue of methyl alcohol and other toxic carbon compounds in the denitrified water.

Another method frequently used to denitrify waters is that of using ion exchangers, which can cause environmental damages. For example, as for strong basic anionic exchangers to treat drinking water, some potentially toxic organic compounds can percolate through the resin. The use of ion exchanger causes a certain number of technical problems as well. The relative selectivity for nitrates is poor compared to that for sulfates, which makes the technology too costly if used for water rich in sulfates. In addition this technique needs large quantities of regenerators. Saturated regenerators contain high concentrations of chloride, and normally cannot be discharged into rivers; removal through tanks involves high operating costs. In any case to abate heavy metals, currently there are not safe, convenient methods to remove heavy metals including cadmium, zinc, and lead.

As far as phosphorus abatement is concerned, the methods adopted are:

deviation and canalization of the waters that enter ponds and reservoirs;
elimination of nutrients from ponds;
reduction of nutrients from effluents;
reduction of eutrophic action caused by the nutrients already present in the waters.

Reduction of nutrient eutrophic action can be done in other ways:

It is possible to aerate hypolimnetic waters and unlayer deep basins to improve the concentration of dissolved oxygen;

Dredge the bottom of the basin to remove phosphorus-rich sediments;

Add chemicals to the eutrophized waters to precipitate the nutrients, and block them in the sediments.

To this end have been used metallic salts including those of iron, aluminum, calcium, zirconium. All have the property of binding ions of phosphorus dissolved in water, and of forming compounds that precipitate in the sediments. The use of these salts may cause numerous problems of cost, toxicity for the aquatic life, or of stability in the compounds as chemical and physical conditions of the water change.

A solution relating to the same problem exposed in the title has been proposed with patent application no. 82639 A/90, also filed with the Italian Patent Office on Nov. 12, 1990, in the name of the same inventors. This method and related product have the goal to purify waters polluted by nitrogen, phosphorus, heavy metals, and heavy metals in conjunction with chlorinated solvents. The product in question is a liquid mixture composed by humic acid, or by humic acid with the addition of metallic salt, depending on the type of pollution abatement desired. The humic acid in question is extracted from oxidized lignite, also known as leonardite, a fossilized plant matter like peat, and is present in a concentration varying from 1% to 15%; the metallic salt is present in a concentration varying from 1% to 6%. However, in this above mentioned solution there is an inconvenience. The addition of a metallic salt to the humic acid as described, causes the product to congeal, making it difficult to dispense it in the purification tank.

All the water purification methods heretofore known suffer from a number of disadvantages:

a) Difficulty to control the residue of toxic carbon;
b) High cost of the technology for water rich in sulfates;
c) High operating cost for the removal of regenerators containing high concentrations of chloride;
d) No convenient methods of removing heavy metals including cadmium, zinc, lead.
e) Problems related to cost, toxicity for the aquatic life, or of stability in the compounds as chemical and physical conditions of the water change, when abating phosphorus;
f) Difficulty to dispense in the purification tank the liquid mixture that triggers the purification process.

OBJECTS AND ADVANTAGES

Accordingly, besides the objects and advantages of the invention described, several objects and advantages of the present invention are:

a) Ease of control of the residue of toxic carbon;
b) Contained cost of the technology for water rich in sulfates;
c) Contained operating cost, thanks to the absence of toxic regenerators to be removed;
d) Convenient method to remove heavy metals including cadmium, zinc, and lead.
e) High efficiency in abating phosphorus and nitrogen, without problems related to toxicity for the aquatic life, or stability in the compounds for phosphorus abatement as chemical and physical conditions of the water change;

f) Ease of dispensing in the purification tank the liquid mixture that triggers the purification process.

FURTHER OBJECTS AND ADVANTAGES ARE g) Easier and more correct dosage of the liquid mixture;

h) Valuable deodorizing and decoloring effects.

i) Effectiveness in a wide range of wastewater pH.

Still further objects and advantages will become apparent from a consideration of the process sketches and ensuing description.

BRIEF DESCRIPTION OF THE DRAWINGS

The process flowchart is illustrated in FIG. 1, without showing a particular order in which the various mixtures have to be added to the waste water.

List of Reference Numerals (1) Leonardite
(2) Alkali
(3) Extraction process
(4) Liquid mix of humic acid and fulvic acid
(5) Polluted water
(6) Metallic salt
(7) Mixing, combination and reaction of chemicals
(8) Sedimentation process
(9) Sludge
(10) Purified water
(11) Agricultural fertilizer

SUMMARY OF THE INVENTION

Figure 1:
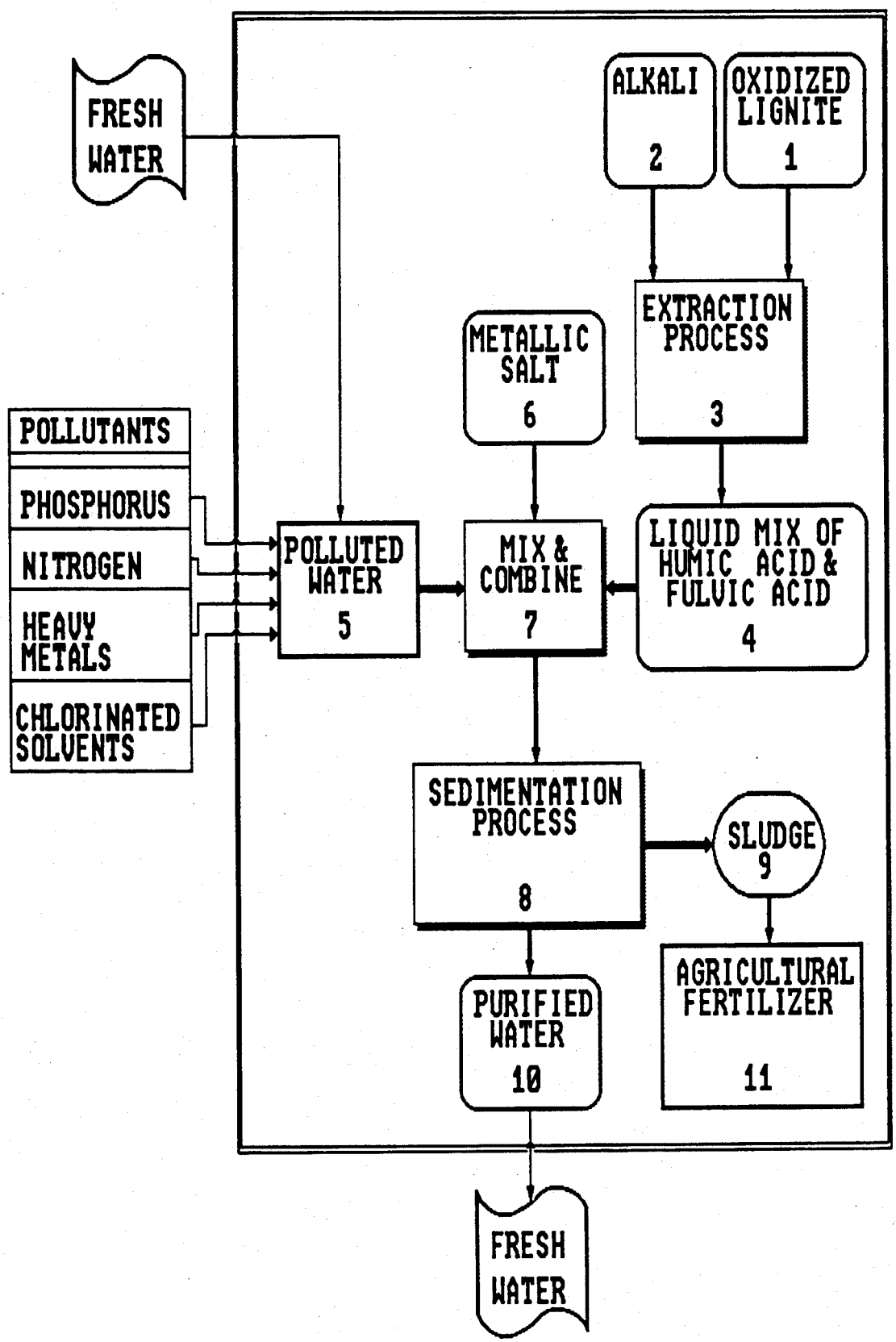

A method and related product for purification of waste water, especially of water polluted with phosphorus, nitrogen, heavy metals, and chlorinated solvents. The purification process consists of adding metallic salt and a particular liquid mixture rich in humic and fulvic acid, to the waste water and mixing it. The pollutants interact with the liquid mixture, and form very stable combinations. This chemical reaction results in a flaky precipitate forming a sludge that can be removed with common techniques.

The liquid mixture rich in humic and fulvic acid, is extracted through alkali from lignite, leonardite and fossils of vegetal origin like peat. The liquid mixture so obtained is ready to be mixed with the waste water.

DESCRIPTION OF INVENTION

This invention consists of two steps:

a) Employing a mixture (4) of humic acid and fulvic acid; the humic and fulvic acid can be extracted (3) through alkali (2), starting from lignite, leonardite (1) and fossils of vegetal origin like peat; the types of alkali (2) that can be employed for the extraction include potassium hydroxide, KOH, and sodium hydroxide, NaOH; the mixture (4) is preferably obtained as a liquid; the proportion of humic acid and fulvic acid may range from 1% to 21% as a percentage of the liquid mixture (4); a chemical-physical analysis of a sample of the liquid mixture (4) of humic acid and fulvic acid HA+FA, after the extraction (3) with alkali (2) gave the following results,

| Organic Nitrogen | 0.18% |
| Inorganic Nitrogen | traces |
| Phosphorus ($P_2O_5$) | 7.1 ppm |

-continued

| Potassium | 1.1% |
| Sodium | 0.08% |
| HA + FA | 12% |
| $H_2O$ | 86.639% |

This first structure of the liquid mixture (4), uncombined with metals, is very porous and contains very large surface areas on which many oxygen-containing functional groups occur. These groups can interact with many pollutants, especially metals, to form stable combinations.

b) Dispersing the mixture of humic and fulvic acid (4) in the waste water to be treated (5); the ratio of the liquid mixture (4) to the waste water (5) depends on the concentration of the polluting substances; to abate heavy metals the concentration of the liquid mixture (4) ranges in a ratio of 1 to 500 grams per 100 liters of water (5); in processes of biologic denitrification, the ratio of the liquid mixture (4) to the waste water (5) ranges in a ratio of 1 to 500 grams per 1000 liters of water (5).

However, one has to take into account the need to abate nitrogen, phosphorus, and chlorinated solvents too, that most times are present in massive way in polluted waters. In this case, the above step b) has to be subdivided in two separate substeps.

b1) Dispersing in the waste water (5) the mixture (4) of humic and fulvic acid, in a proportion between 0.01% and 6% of the water (5) to be treated. More precisely, once the liquid mixture (4) of humic acid and fulvic acid is dispersed (7) in the water (5) to be treated, there is a waiting period of approximately one half hour to one hour for the chemical reaction (7) between the mixture (4) and the waste water (5) to happen.

b2) Introducing later a metallic salt (6), for example a bivalent or trivalent cation, like aluminum salt. More precisely, after the reaction described in substep (b1) has happened, a metallic salt (6) like aluminum sulfate, $Al_2(SO_4)_2 \cdot 12H_2O$, or potassium aluminum sulfate, $KAl(SO_4)_2 12H_2O$, is added (7) in a proportion approximately between 0.02% and 1% of the water (5). The mixing order of liquid mixture (4) and metallic salt (5) can be inverted; however, the sequence given at the beginning of this step (b2) is most effective.

The chemical reaction (7) that follows forms stable combinations, which through metallic bonds allow the adsorption of anions, for example nitrates, phosphates, and chlorinated solvents. The combinations that are thus formed between the primitive structure, the metals, the nitrates or the phosphates, and the chlorinated solvents, tend to coagulate and subsequently to sediment (8), thereby eliminating their presence in the water (10). The decay kinetics of such a product can vary greatly, depending on the concentrations of the pollutants. In most cases one to two hours, are sufficient.

CONCLUSION

The sedimentation sludge (9) obtained through the invention exposed incorporates most of the pollutants that were previously dissolved in the waste water (5). By removing the sedimentation sludge (9) from the ambient containing the waste water, it is possible to obtain purified water (10); any well renown sludge removal process can be applied to this invention to obtain purified water that can be reclaimed into the environment.

SCOPE OF INVENTION AND RAMIFICATIONS

The goal of this invention is that of obviating the drawbacks of other purification methods, for the purification of waters polluted by nitrogen, phosphorus, heavy metals, and chlorinated solvents.

The liquid mixture (4) of humic acid and fulvic acid used in this invention has large surface areas on which many oxygen-containing functional, such as carboxyls and hydroxyls, are present. Through the invention presented here, it is possible to obtain an intimate contact for a prolonged time between these groups and the pollutants. Thereby, stable combinations are formed with a very high percentage of the pollutants, drastically reducing their content in the waste water. The combination prevents the pollutant from being released back into the environment. Thanks to the stability of the combination, the sedimentation sludge (9) obtained through the method disclosed may be used as fertilizers in agriculture for fertirrigation (11).

Although the description above contains many specificities, these should not be construed as limiting the scope of the invention, but merely providing illustrations of some of the presently preferred features of this invention. For example, there are more pollutants than those mentioned, that can be purified from the waste water; other extraction processes, or other materials can be employed to obtain the mixture of humic acid and fulvic acid, etc.

Thus the scope of the invention should be determined by the appended claims and their legal equivalents, rather than by the examples given.

We claim:

1. A liquid solution for the purification of waste water, comprising an amount of humic acid and fulvic acid ranging between 1% and 21%, wherein the content of fulvic acid relative to that of humic acid is comprised between 1 part of fulvic acid to 4 parts of humic acid, and 3 parts of fulvic acid to 1 part of humic acid, to free the water from pollutants selected from the group consisting of phosphorus, nitrogen, heavy metals, and chlorinated solvents.

2. The solution of claim 1 in which the humic acid and fulvic acid are extracted by means of alkali from leonardite, and subsequently adjusted to the relative proportion required.

3. A method of purifying wastewater containing pollutants selected from the group consisting of phosphorus, nitrogen, heavy metals, and chlorinated solvents, comprising the steps of:
   a) dispersing within said wastewater between 1 and 6000 grams of the solution of claim 1 per 100 liters of said wastewater,
   b) allowing said solution to react and coagulate.

4. A method of purifying wastewater containing heavy metals, comprising the steps of:
   a) dispersing within said wastewater between 1 and 500 grams of the solution of claim 1 per 100 liters of said wastewater,
   b) allowing said solution to react and coagulate.

5. A method of denitrifying waste water, to be used in conjunction with a process of biologic denitrification employing bacteria, to help with said process by providing nutrient to the bacteria, comprising the steps of:
   a) dispersing within said wastewater between 1 and 500 grams of the solution of claim 1 per 1000 liters of said wastewater,
   b) allowing said solution to react, feed the bacteria, and coagulate.

6. A method of purifying wastewater containing pollutants selected from the group consisting of phosphorus, nitrogen, and chlorinated solvents, comprising the steps of:
   a) dispersing within said waste water an amount of the solution of claim 1 between 0.01% and 6% of the wastewater to be treated,
   b) dispersing in the wastewater a metal salt possessing a bivalent or a trivalent cation, in proportion ranging between 0.02% and 1% of the wastewater.
   c) allowing between one half hour to one hour between said steps a) and b).

7. The method of claim 6 wherein said metal salt is selected from the group consisting of aluminum sulfate, $Al_2(SO_4)_2 12H_2O$, and potassium aluminum sulfate, $KAl(SO_4)_2 12H_2O$.

* * * * *